United States Patent [19]

Weisburn et al.

[11] Patent Number: 4,988,000

[45] Date of Patent: Jan. 29, 1991

[54] VIDEOCASSETTE STORAGE AND DISPLAY SLEEVE

[75] Inventors: James T. Weisburn, Massillon; Gale W. Essick, East Canton, both of Ohio

[73] Assignee: Alpha Enterprises, Inc., East Canton, Ohio

[21] Appl. No.: 474,944

[22] Filed: Feb. 5, 1990

[51] Int. Cl.$^5$ .......................................... B65D 85/672
[52] U.S. Cl. ................................ 206/387; 206/45.34; 206/1.5; 229/9
[58] Field of Search .................. 206/1.5, 45.31, 45.34, 206/232, 424, 387, 459; 229/9, 10, 11

[56] References Cited

U.S. PATENT DOCUMENTS

| | | | |
|---|---|---|---|
| Re. 32,296 | 11/1986 | Wynalda | 206/387 |
| 3,664,492 | 5/1972 | Wallace | 206/387 |
| 3,912,077 | 10/1975 | Krynicki | 206/387 |
| 4,192,439 | 3/1980 | Segal | 206/45.34 |
| 4,240,551 | 12/1980 | Osanai | 206/387 |
| 4,361,233 | 11/1982 | Holkestad | 206/387 |
| 4,365,712 | 12/1982 | Oishi et al. | 206/387 |
| 4,512,468 | 4/1985 | Stravitz | 206/387 |
| 4,640,415 | 3/1987 | Ackeret | 206/387 |
| 4,645,075 | 2/1987 | Van der Lely | 206/387 |
| 4,678,245 | 9/1987 | Fouassier | 312/15 |

FOREIGN PATENT DOCUMENTS

| | | | |
|---|---|---|---|
| 182721 | 5/1986 | European Pat. Off. | 206/387 |
| 2700556 | 1/1978 | Fed. Rep. of Germany | 206/387 |
| 3123193 | 12/1982 | Fed. Rep. of Germany | 206/387 |
| 178033 | 9/1985 | Japan | 206/387 |
| 2079726 | 1/1982 | United Kingdom | 206/387 |

Primary Examiner—David T. Fidei
Attorney, Agent, or Firm—Michael Sand Co.

[57] ABSTRACT

A sleeve for storing and displaying a videocassette comprises a clear flexible plastic, elongated rectangular one-piece member, formed with an interior storage chamber completely enclosed except for an end opening through which a videocassette is inserted into and removed from the chamber. A chipboard cover having printed indicia thereon identifying a prerecorded program on the videocassette is retained within the chamber and slidably receives the videocassette therein. A pair of juxtaposed, elongated, preferably convex flanges, is formed on a spaced-apart pair of front and rear walls of the sleeve and extend partially across the end opening to retain the videocassette within the chipboard sleeve. Application of pressure by the thumb and finger of a user on spaced sidewalls of the sleeve adjacent to the end opening deforms the juxtaposed flanges to a parallel or concave configuration to enlarge the opening for removing the videocassette from the storage container for use, with the chipboard cover remaining in the storage chamber for subsequent removal at a later date in a nondeformed condition.

12 Claims, 3 Drawing Sheets

VIDEOCASSETTE STORAGE AND DISPLAY SLEEVE

BACKGROUND OF THE INVENTION

1. Technical Field

The invention relates to containers, and in particular to a sleeve for storing and displaying a videocassette. More particularly, the invention relates to such a sleeve for storing and displaying a videocassette in which the videocassette can be quickly and easily slidably inserted into and removed from the sleeve, and in which a chipboard cover having printed indicia thereon identifying a prerecorded program on the videocassette remains in the sleeve upon removal of the videocassette therefrom.

2. Background Information

Rentals of videocassettes having prerecorded programs thereon such as popular movies, exercise routines, etc., continue to increase as the number of homes having videocassette recorders/players increases. As videocassette rentals and the number of program titles available on videocassette continue to increase, owners of stores which rent the videocassettes continue to strive for more efficient ways of storing and displaying the videocassettes.

The current practice in most videocassette rental stores is to display chipboard covers or boxes having printed indicia thereon identifying the prerecorded programs on the videocassettes, on shelves in areas of the store to which the public has access. Customers then are free to browse through the boxes to assist them in choosing which videocassettes to rent. After choosing a particular prerecorded program which a customer desires to view, he/she either takes the empty chipboard box for that videocassette from the shelf or some other means of identification such as a code number tag corresponding to the videocassette, to a store employee stationed behind a counter. The employee then retrieves the desired videocassette from a storage area behind the counter or from a remote room and completes the rental transaction. The customer usually takes the rented videocassette home in a usual videocassette storage container of a type which is well-known in the art and which has a lid for complete closure of the container.

Such a system requires owners of videocassette rental stores to not only provide enough floor space for public display of the information-bearing chipboard or cardboard boxes so that customers can choose the prerecorded programs which they wish rent, but also to provide adequate behind-the-counter inventory areas for storing the actual videocassettes. In addition, the public is continually handling the chipboard boxes when browsing through the store to choose the videocassettes, and eventually the boxes wear out. If the store has bought only a single copy of a particular videocassette program title and its box wears out, the only way to replace the box is to buy an additional copy of the videocassette, which could be a needless increase of inventory costs, especially for infrequently rented videocassettes. Also, most rental store owners typically resell their videocassettes after approximately six months of customer use. To help enhance the resale value of the used videocassettes, they are placed in the chipboard boxes in which they were originally shipped from the videocassette manufacturer to the rental store owner, and shrink-wrapped. However, excessively handled and worn boxes further reduces the attractiveness of the already-used videocassettes as a resale item.

The subject invention enables the videocassette rental store owner to display the information-bearing chipboard boxes in a protective transparent sleeve with or without the actual videocassette therein. If theft of the videocassettes is not a concern in a particular store, the owner may desire to place the videocassettes within the sleeve together with its corresponding chipboard box, and display the sleeve on a shelf to which the public has access. A customer then simply would remove the sleeve from the shelf and take the same to an employee at a counter for completing the rental transaction. The customer could transport the videocassette home in the sleeve, or the employee could remove the videocassette from the sleeve and place the videocassette in a usual completely enclosed videocassette storage container for transport to the customer's home.

In stores where theft is a problem, the owner may choose merely to place the sleeve containing only the chipboard box on the public access shelves. A customer desiring to rent a particular videocassette would take the sleeve and chipboard box to an employee at the counter who would then complete the rental transaction, either utilizing the sleeve for transport of the videocassette to the customer's home or allowing the customer to take the videocassette home in a usual lid-type videocassette storage container. Thus, these alternate systems not only would preserve the chipboard boxes, but the former system could also significantly reduce behind-the-counter storage space.

Therefore, the need exists for a videocassette storage and display sleeve which stores and displays a videocassette and/or its corresponding chipboard cover having printed indicia thereon identifying a prerecorded program on the videocassette, and which enables the videocassette to be quickly and easily inserted into and removed from the sleeve while the chipboard cover remains in the sleeve.

SUMMARY OF THE INVENTION

Objectives of the invention include providing a videocassette storage and display sleeve in which a videocassette can be quickly and easily inserted into and removed from the sleeve by mere application of pressure by a thumb and a finger of a user to the sleeve.

Another objective of the invention is to provide such a videocassette storage and display sleeve in which a chipboard cover having printed indicia thereon identifying a prerecorded program on the videocassette is retained within the sleeve and slidably receives the videocassette therein, and remains in the sleeve upon removal of the videocassette therefrom.

A further objective of the invention is to provide such a videocassette storage and display sleeve which protects the chipboard cover and/or videocassette contained therein from excessive handling and resultant wear or damage.

A still further objective of the invention is to provide such a videocassette storage and display sleeve which enables the owner of a videocassette rental store to operate with less space by placing the sleeve containing the chipboard cover and its corresponding videocassette in public access areas, thereby eliminating the need for behind-the-counter storage areas.

Still another objective of the invention is to provide such a videocassette storage and display sleeve within which a videocassette can be transported to a customer's home for viewing.

These objectives and advantages are obtained by the improved sleeve for storing and displaying a videocassette of the present invention, the general nature of which may be stated as including, a pair of spaced parallel front and rear walls, and a pair of spaced parallel sidewalls forming a generally rectangular-shaped storage chamber, with the walls being formed of a flexible plastic material and at least the front wall being transparent; the sleeve having first and second ends, with the first end being formed with a generally rectangular-shaped opening through which a videocassette can be slidably inserted into and removed from the storage chamber, and the second end being formed with stop means for generally retaining the videocassette within the storage chamber; and flange means formed integrally with certain of the walls adjacent to the first end opening and extending partially across the opening for blocking the opening to retain the videocassette in the storage chamber when the flange means is in a nondeformed first position, with the flange means being nondestructively deformable between the first position and a deformed second position upon application of pressure to the sidewalls adjacent to the first end opening, to remove the flange means from blocking the end opening enabling the videocassette to be removed from the storage chamber, while retaining the chipboard cover in the outer sleeve.

BRIEF DESCRIPTION OF THE DRAWINGS

A preferred embodiment of the invention, illustrative of the best mode in which applicants have contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
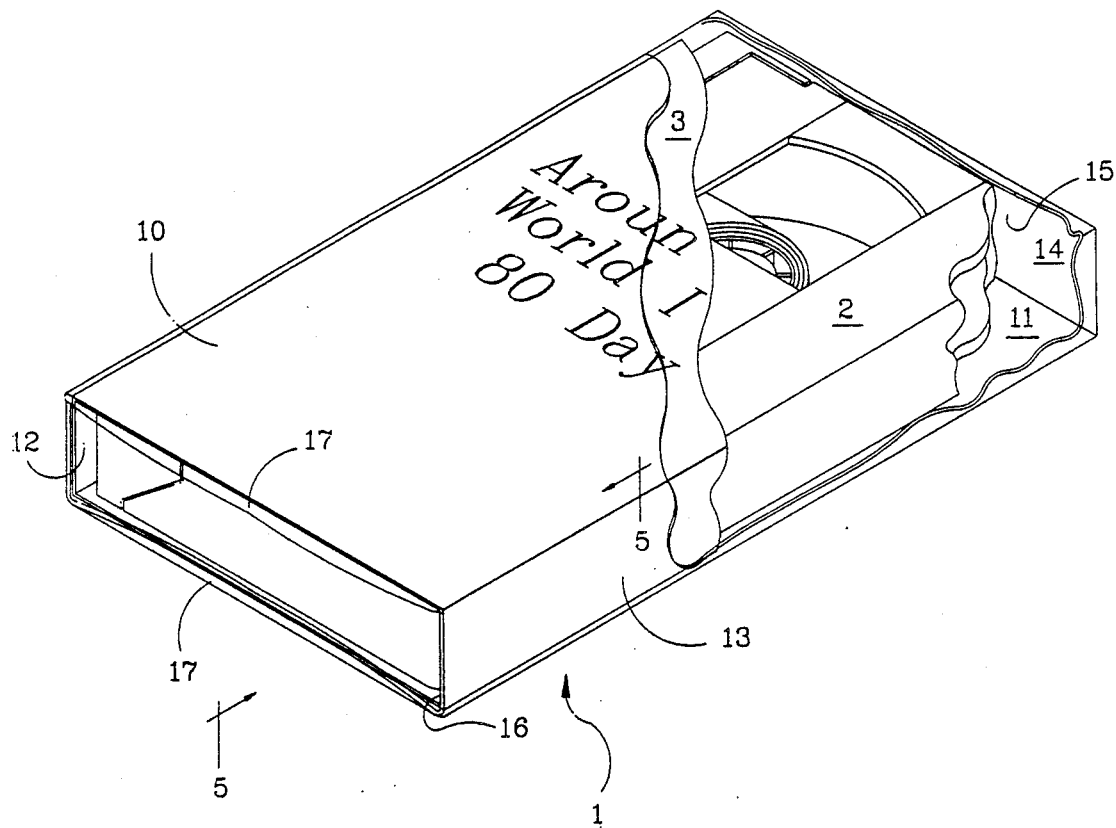
FIG. 1 is a perspective view of the storage and display sleeve of the present invention, with portions broken away, showing a chipboard cover and a videocassette contained therein.

The sleeve for storing and displaying a videocassette of the present invention, is indicated generally at 1 and is shown in FIG. 1. Sleeve 1 is intended for storing and displaying a usual videocassette of a type which is well-known in the art, and/or the chipboard cover or box 3 of a type also well-known in the art and having printed indicia thereon identifying the prerecorded program contained on the videocassette. Although the preferred embodiment is for a videocassette, the present invention could be easily adaptable for use with audio cassettes, compact discs, etc.

Sleeve 1 comprises a pair of spaced parallel front and rear walls 10 and 11, respectively, a pair of spaced parallel sidewalls 12 and 13, and an end wall 14 which extends between and is connected to the front wall, rear wall, and sidewalls adjacent to one of the ends of sleeve 1 to close the end (FIG. 1). Front wall 10, rear wall 11, sidewalls 12 and 13, and end wall 14, form a generally rectangular-shaped storage chamber 15. The edges of walls 10–13 on the end of sleeve 1 opposite from end wall 14 define a generally rectangular-shaped opening 16 in sleeve 1 (FIG. 2), which communicates with storage chamber 15 for slidably inserting a videocassette into and removing it from the storage chamber.

Figure 2:
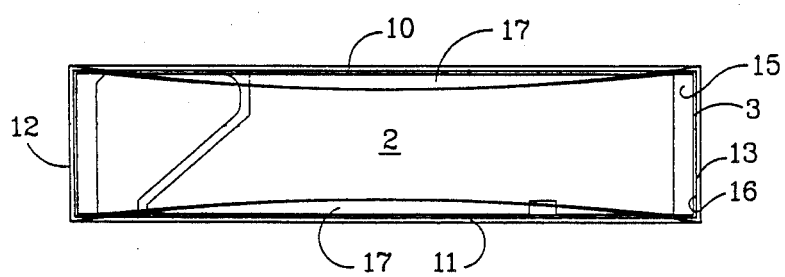
FIG. 2 is an end view of the open end of the sleeve in a nondeformed first position.
Figure 5:
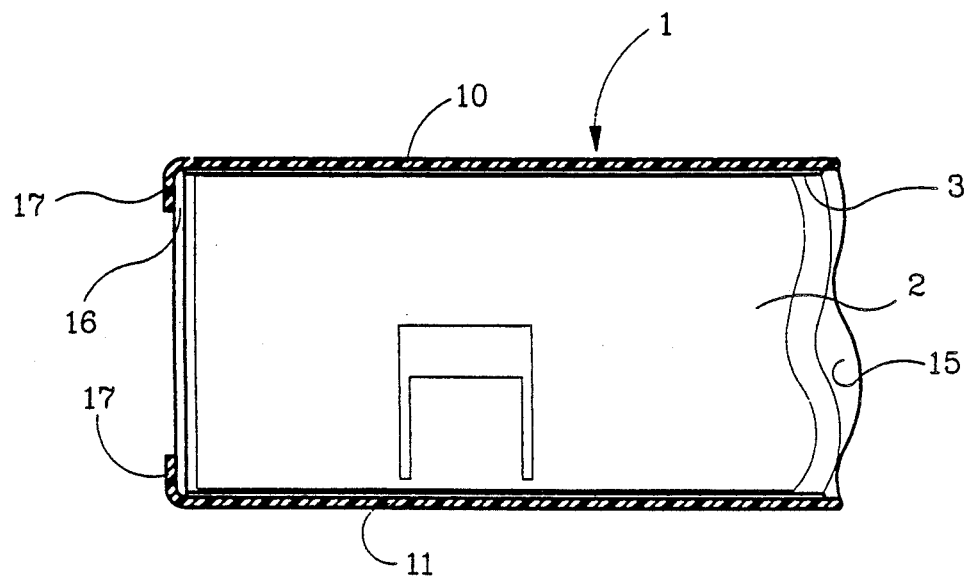
FIG. 5 is a greatly enlarged fragmentary sectional view taken on line 5—5 of FIG. 1.

In accordance with one of the main features of the present invention, a pair of opposed, elongated, generally convex-shaped flanges 17 is formed on the edges of front and rear walls 10 and 11 adjacent to end opening 16, and extend continuously across the opening between sidewalls 12 and 13 (FIGS. 1, 2 and 5). Flanges 17 extend partially across end opening 16 for blocking the opening to retain videocassette 2 in storage chamber 15.

Sleeve 1 preferably is formed of transparent flexible polypropylene as a one-piece member utilizing either a blow molding or injection molding process. Sleeve 1 also could be extruded in combination with secondary operations. Walls 10–14 and flanges 17 preferably have a general uniform thickness within the range of 0.020 and 0.070 inches, with the height of each flange 17 at its midpoint of curvature being generally within the range of 1/32 and ¼ inches. The overall dimensions of sleeve 1 include a length within the range of 7½ and 8 inches, a width within the range of 4¼ and 4⅜ inches, and a height within the range of 1 and 1¼ inches.

Videocassette storage and display sleeve 1 of the present invention is used in the following manner. Video rental stores normally purchase large numbers of videocassettes having prerecorded programs thereon such as popular movies, exercise routines, etc., from the manufacturer or a distributor thereof. These videocassettes typically then are rented out to the public for a fee. A new videocassette is placed in the rental cycle for approximately six months, after which it is sold for addition to a customer's home video library and replaced with another new videocassette. The manufacturer typically packages the videocassettes in a flexible cardboard or chipboard box 3 having identifying indicia thereon, such as photographs and written summaries, for identifying the prerecorded program contained on the videocassette. The closure end flaps on one of the ends of chipboard box 3 are removed at the rental store and the chipboard box is placed in storage and display sleeve 1. More specifically, box 3 is located within storage chamber 15 of sleeve 1 and conforms to the interior of sleeve walls 10–14 which define the chamber, and is configured to slidably receive videocassette 2 therein through its open end.

Figure 3:
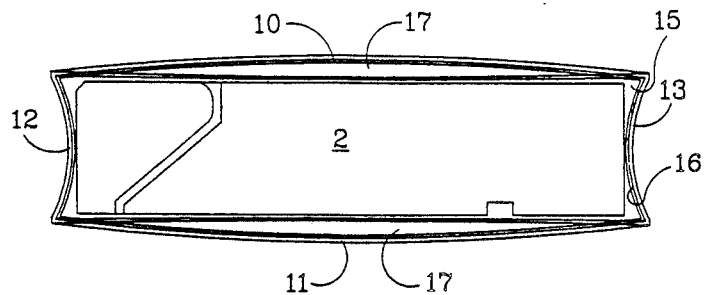
FIG. 3 is an end view similar to FIG. 2, showing the sleeve in a deformed second position subsequent to application of pressure to the sidewalls adjacent to the end opening, to enlarge the size of the end opening enabling the videocassette to be removed from the sleeve.
Figure 4:
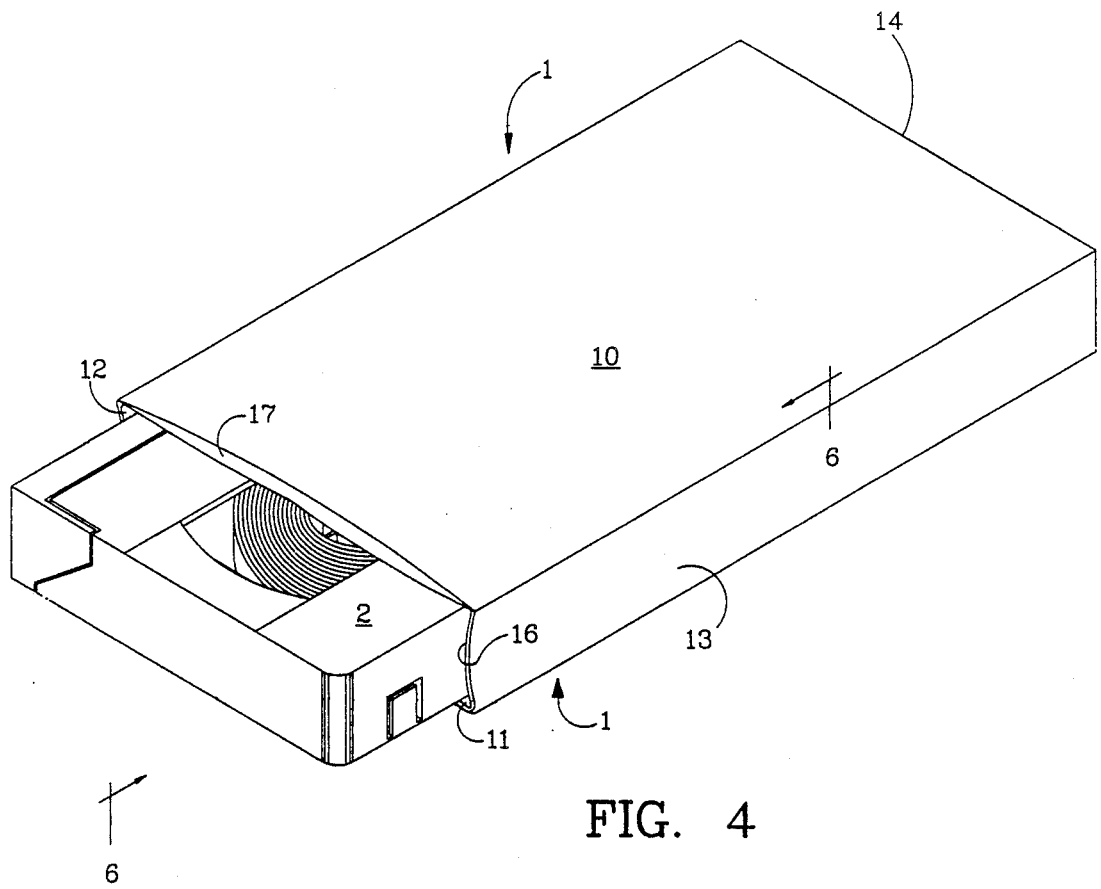
FIG. 4 is a perspective view of the storage and display sleeve of the invention, showing the sleeve in the deformed second position and the videocassette partially removed therefrom.
Figure 6:
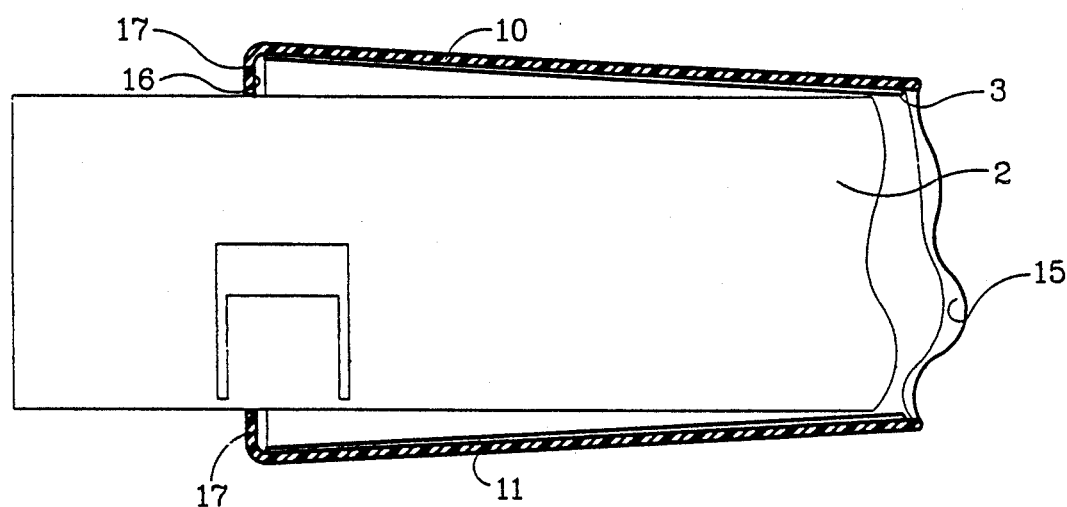
FIG. 6 is a greatly enlarged fragmentary sectional view taken on line 6—6 of FIG. 4.

When a user desires to insert or remove videocassette 2 into or from sleeve 1, sidewalls 12 and 13 are squeezed together with a thumb and a finger to nondestructively deform the sleeve, and in particular flanges 17 thereof, from a nondeformed first position, as shown in FIGS. 1, 2 and 5, to a deformed generally parallel or concave second position as illustrated in FIGS. 3, 4 and 6. This application of pressure to sidewalls 12 and 13 adjacent to end opening 16, removes flanges 17 from blocking the end opening enabling videocassette 2 to be inserted into or removed from storage chamber 15 of sleeve The practical and preferred use of sleeve 1 in a video rental store is as follows. Sleeve 1 containing box 3 and videocassette 2, as shown in FIG. 1, is placed on a shelf in a public access area of the store so that a customer wishing to rent one or more videocassettes may determine what is contained on a videocassette by viewing the information printed on the box through the transparent walls of the sleeve. When the customer has determined that he wishes to rent a particular videocassette, he merely takes the sleeve containing the desired videocassette to a counter where an employee will complete the rental transaction. Then, the videocassette can be removed from the store and transported to the customer's home in the sleeve. When the customer desires to view the videocassette, he merely grasps the sidewalls of the sleeve adjacent to end opening 16 with a thumb and a finger and squeezes the sidewalls together to enlarge the size of the end opening by removing flanges 17 from their generally convex non-deformed first position (FIGS. 1, 2 and 5) to the generally parallel or concave, non-destructively deformed second position (FIGS. 3, 4 and 6), thereby enabling the videocassette to be removed from storage chamber 15. However, chipboard box 3 is retained within the sleeve due to its frictional fit within the sleeve walls.

It can be seen that this system of storing and displaying videocassettes has several advantages. First, when customers browse through the store in choosing which videocassettes to rent, the sleeve protects the box and videocassette from wear and damage from constant handling. More particularly, this enables the video store owner to sell the used videocassette in its original, fresh-looking chipboard box after the typical six-month rental life of the videocassette has elapsed since the chipboard box also can be removed for reuse without damage. Moreover, the sleeve enables the videocassette and box to be stored and displayed together, thereby eliminating the need for behind-the-counter storage areas for the videocassettes separate from their corresponding chipboard boxes in the display area of the store. Also, the sleeve can be used to safely transport a rented videocassette to a customer's home.

It is important to note that the inventors have contemplated applying an electronic source means of a type which is well-known in the art to the sleeve, to be used in combination with electronic detector means positioned at the exit area of a video rental store to discourage and prevent shoplifting of the videocassettes. If theft is an extremely serious problem in a particular store, the cassettes merely can be stored behind the counter in any suitable manner such as in usual videocassette cases of a type which are well-known in the art, with the sleeve and chipboard box contained therein being displayed in public access areas. This system would still protect the box from wear, but would not eliminate the need for storage space for the videocassettes.

Again, the main feature of the videocassette storage and display sleeve of the present invention is the construction of sleeve 1 from a clear flexible plastic which enables the sleeve to protectively display the chipboard boxes, but also to be used as an effective storage and transport device for videocassettes which can be quickly and easily inserted into and removed from the sleeve.

In summary, the videocassette storage and display sleeve of the invention enables a videocassette to be quickly and easily inserted into and removed from the sleeve by mere application of pressure by a thumb and a finger of a user to the sleeve. Moreover, a chipboard cover having printed indicia thereon identifying a prerecorded program on the videocassette is retained within the sleeve and slidably receives the videocassette therein, and remains protected in the sleeve upon removal of the videocassette therefrom. The sleeve protects the chipboard cover and videocassette contained therein from excessive handling and resultant wear or damage. Thus, the owner of a videocassette rental store can operate with less space by placing the sleeve containing the chipboard cover and its corresponding videocassette in public access areas and eliminating behind-the-counter storage areas for the videocassettes. The sleeve also can be used to transport rented videocassettes to a customer's home for viewing.

Accordingly, the improved videocassette storage and display sleeve is simplified, provides an effective, safe, inexpensive, and efficient sleeve which achieves all the enumerated objectives, provides for eliminating difficulties encountered with prior containers, and solves problems and obtains new results in the art.

In the foregoing descriptions, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved videocassette storage and display sleeve is constructed and used, the characteristics of the construction, and the advantageous, new and useful results obtained; the new and useful structures, devices, elements, arrangements, parts and combinations, are set forth in the appended claims.

We claim:

1. A sleeve for storing and displaying a cassette including, a pair of spaced parallel front and rear walls, and a pair of spaced parallel sidewalls forming a generally rectangular-shaped storage chamber, with said walls being formed of a flexible plastic material and at least the front wall being transparent; said sleeve having first and second ends, with the first end being formed with a generally rectangular-shaped opening through which a cassette can be slidably inserted into and removed from the storage chamber, and the second end being formed with stop means for generally retaining the cassette within said storage chamber; and flange means formed integrally with the front and rear walls adjacent to the first end opening and extending partially across said opening for blocking the opening to retain the cassette in the storage chamber when the flange means is in a nondeformed first position by engaging a front edge of the cassette, with said flange means being non-destructively deformable between the first position and a deformed second position upon manually squeezing inwardly externally on the sidewalls adjacent to the first end opening, to remove the flange means from blocking said end opening enabling the cassette to be removed from the storage chamber.

2. The sleeve defined in claim 1 in which the stop means is an end wall which extends between and is connected to the front wall, rear wall and sidewalls adjacent to the second end of the sleeve to close said second end.

3. The sleeve defined in claim 1 in which a hollow flexible cover having printed indicia thereon identifying a prerecorded program on the cassette, is located within the storage chamber of the sleeve and conforms to the interior of the sleeve walls defining said chamber and is configured to slidably receive the cassette therein; and in which the cover remains within the storage chamber upon removal of the videocassette therefrom.

4. The sleeve defined in claim 3 in which the cover is formed of chipboard and includes at least one open end.

5. The sleeve defined in claim 1 in which the flange means includes a pair of juxtaposed elongated flanges formed on the edges of the front and rear walls, which edges together with the edges of the sidewalls define the first end opening; and in which the flanges have generally convex configurations.

6. The sleeve defined in claim 5 in which the flanges extend continuously across the first end opening between the sidewalls.

7. The sleeve defined in claim 5 in which the height of each flange at its midpoint of curvature is generally within the range of 1/32 and ¼ inches.

8. The sleeve defined in claim 5 in which the flanges assume a generally parallel configuration when in the deformed second position to enlarge the size of the first end opening.

9. The sleeve defined in claim 1 in which the walls, flange means and stop means have a generally uniform thickness within the range of 0.020 and 0.070 inches.

10. The sleeve defined in claim 1 in which the length of the sleeve is within the range of 7½ and 8 inches; in which the width of the sleeve is within the range of 4¼ and 4⅝ inches; and in which the height of the sleeve is within the range of 1 and 1¼ inches.

11. The sleeve defined in claim 1 in which all of the walls are formed of transparent plastic.

12. The sleeve defined in claim 1 in which the sleeve is formed of polypropylene.

* * * * *